(12) United States Patent
Marcos Pastor et al.

(10) Patent No.: US 10,855,169 B1
(45) Date of Patent: Dec. 1, 2020

(54) CONFIGURABLE MULTI-PHASE CHARGER

(71) Applicant: Lear Corporation, Southfield, MI (US)

(72) Inventors: Adria Marcos Pastor, Valls (ES);
Josep Maria Bosque, Valls (ES);
Alberto Martinez Ramirez, Valls (ES);
Antonio Martinez Perez, Valls (ES);
Victor Saborido Rodriguez, Valls (ES); Edgar Zahino Andres, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/566,292

(22) Filed: Sep. 10, 2019

(51) Int. Cl.
| | |
|---|---|
| *H02M 1/36* | (2007.01) |
| *H02M 7/217* | (2006.01) |
| *H02J 7/34* | (2006.01) |
| *H02M 1/084* | (2006.01) |
| *H02J 7/02* | (2016.01) |
| *H02M 7/04* | (2006.01) |

(52) U.S. Cl.
CPC ............. *H02M 1/36* (2013.01); *H02J 7/02* (2013.01); *H02J 7/345* (2013.01); *H02M 1/084* (2013.01); *H02M 7/2173* (2013.01); *H02M 7/04* (2013.01)

(58) Field of Classification Search
CPC ........ H02M 1/36; H02M 7/04; H02M 7/2173; H02M 1/084; H02J 7/345
See application file for complete search history.

(56) References Cited

U.S. PATENT DOCUMENTS

| | | | |
|---|---|---|---|
| 4,910,654 A | 3/1990 | Forge | |
| 7,965,529 B2 | 6/2011 | Gibbs et al. | |
| 8,154,895 B2 | 4/2012 | Gilmore | |
| 8,878,391 B2 | 11/2014 | Taylor | |
| 9,287,768 B2 | 3/2016 | Guyomard et al. | |
| 9,318,969 B2 | 4/2016 | Dillig et al. | |
| 9,466,997 B2 | 10/2016 | Silva et al. | |
| 2013/0032851 A1 | 2/2013 | Sheats et al. | |
| 2014/0139194 A1 | 5/2014 | Dinand Da Silva et al. | |
| 2015/0137754 A1* | 5/2015 | Yang | B60L 53/30 320/109 |
| 2015/0138849 A1 | 5/2015 | Bae et al. | |
| 2015/0231976 A1 | 8/2015 | Byun et al. | |
| 2016/0352252 A1* | 12/2016 | Yu | H02M 1/36 |

(Continued)

FOREIGN PATENT DOCUMENTS

EP 2731229 A1 5/2014

*Primary Examiner* — Harry R Behm
(74) *Attorney, Agent, or Firm* — Brooks Kushman P.C.

(57) ABSTRACT

An on-board charger (OBC) for charging a traction battery of an electric vehicle includes a primary phase, a secondary phase, and a pre-charge circuit. Each phase includes a circuit having an input and an output. The primary phase circuit input is connectable to a mains supply to connect the primary phase to the mains supply. The secondary phase circuit input has an input capacitor. The pre-charge circuit is connected between the circuit outputs and is switchable between an opened state in which the pre-charge circuit disconnects the circuit outputs and a closed state in which the pre-charge circuit connects the circuit outputs. When the pre-charge circuit is in the closed state, an electrical current may flow through the pre-charge circuit from the primary phase circuit output to the secondary phase circuit output and through the secondary phase circuit to the input capacitor to charge the input capacitor.

20 Claims, 3 Drawing Sheets

(56) References Cited

U.S. PATENT DOCUMENTS

| | | | |
|---|---|---|---|
| 2019/0036462 A1* | 1/2019 | Tazaki | H02M 1/32 |
| 2020/0052606 A1* | 2/2020 | Tazaki | H02M 1/36 |
| 2020/0083727 A1* | 3/2020 | Sun | B60L 53/20 |

* cited by examiner

CONFIGURABLE MULTI-PHASE CHARGER

TECHNICAL FIELD

The present invention relates to methods and systems for controlling a multi-phase charger such as a multi-phase, on-board charger (OBC) of an electric vehicle.

BACKGROUND

An on-board charger (OBC) of an electric vehicle is used for charging a traction battery of the vehicle. The OBC converts electrical power absorbed from an AC power source into DC electrical power and charges the battery with the DC electrical power.

SUMMARY

An on-board charger (OBC) for charging a traction battery of an electric vehicle is provided. The OBC includes a primary phase including a circuit having an input and an output. The primary phase circuit input is connectable to a mains supply to connect the primary phase to the mains supply. The OBC further includes a secondary phase including a circuit having an input and an output. The secondary phase circuit input has an input capacitor. The OBC further includes a pre-charge circuit connected between the primary phase circuit output and the secondary phase circuit output. The pre-charge circuit is switchable between (i) an opened state in which the pre-charge circuit disconnects the secondary phase circuit output from the primary phase circuit output and (ii) a closed state in which the pre-charge circuit connects the secondary phase circuit output to the primary phase circuit output. When the pre-charge circuit is in the closed state, an electrical current may flow through the pre-charge circuit from the primary phase circuit output to the secondary phase circuit output and through the secondary phase circuit to the input capacitor to charge the input capacitor.

The OBC may further include a controller configured to switch the pre-charge circuit to the closed state upon the controller detecting that the mains supply is a single-phase mains supply after the primary phase has been connected to the mains supply. The controller may be further configured to switch the pre-charge circuit to the opened state upon the controller detecting that the input capacitor has been sufficiently charged with electrical current via the pre-charge circuit.

The OBC may further include a relay connected between the primary phase circuit input and the secondary phase circuit input. The relay is switchable between (i) an opened state in which the relay disconnects the primary phase circuit input from the secondary phase circuit input and (ii) a closed state in which the relay connects the primary phase circuit input to the secondary phase circuit input and thereby connects the secondary phase to the mains supply when the primary phase is connected to the mains supply.

The OBC may further include a controller configured to switch the pre-charge circuit to the closed state upon the controller detecting that the mains supply is a single-phase mains supply after the primary phase has been connected to the mains supply and further configured to maintain the relay in the opened state until the input capacitor has been sufficiently charged with electrical current via the pre-charge circuit and then switch the relay to the closed state. The controller may be further configured to switch the pre-charge circuit to the opened state upon the controller detecting that the input capacitor has been sufficiently charged with electrical current via the pre-charge circuit.

The pre-charge circuit may include a resistor and a switch connected in series. The circuit of at least one of the primary phase and the secondary phase may be an input filter.

The OBC may further include an additional secondary phase and an additional pre-charge circuit. The additional secondary phase includes a circuit having an input and an output. The additional secondary phase circuit input has an input capacitor. The additional pre-charge circuit is connected between the primary phase circuit output and the additional secondary phase circuit output. The additional pre-charge circuit is switchable between (i) an opened state in which the additional pre-charge circuit disconnects the additional secondary phase circuit output from the primary phase circuit output and (ii) a closed state in which the additional pre-charge circuit connects the additional secondary phase circuit output to the primary phase circuit output. When the additional pre-charge circuit is in the closed state, an electrical current may flow through the additional pre-charge circuit from the primary phase circuit output to the additional secondary phase circuit output and through the additional secondary phase circuit to the input capacitor to charge the input capacitor of the additional secondary phase circuit input.

Alternatively, instead of the additional pre-charge circuit, the pre-charge circuit may be further connected between the primary phase circuit output and the additional secondary phase circuit output and be further switchable between (i) a second opened state in which the pre-charge circuit disconnects the additional secondary phase circuit output from the primary phase circuit output and (ii) a second closed state in which the pre-charge circuit connects the additional secondary phase circuit output to the primary phase circuit output. When the pre-charge circuit is in the second closed state, an electrical current may flow through the pre-charge circuit from the primary phase circuit output to the additional secondary phase circuit output and through the additional secondary phase circuit to the input capacitor to charge the input capacitor of the additional secondary phase circuit input.

A method for use with the OBC is also provided. The method includes upon detecting that the mains supply is a single-phase mains supply after the primary phase has been connected to the mains supply, switching the pre-charge circuit to the closed state so that an electrical current may flow through the pre-charge circuit from the primary phase circuit output to the secondary phase circuit output and through the secondary phase circuit to the input capacitor to charge the input capacitor.

The method may further include switching the pre-charge circuit to the opened state upon detecting that the input capacitor has been sufficiently charged with electrical current via the pre-charge circuit.

The method may further include switching the pre-charge circuit to the closed state upon detecting that the mains supply is a single-phase mains supply after the primary phase has been connected to the mains supply; and maintaining the relay in the opened state until the input capacitor has been sufficiently charged with electrical current via the pre-charge circuit and then switching the relay to the closed state. The method may further include switching the pre-charge circuit to the opened state upon detecting that the input capacitor has been sufficiently charged with electrical current via the pre-charge circuit.

Another OBC for charging a traction battery of an electric vehicle is provided. This OBC includes a primary phase including a circuit having an input and an output. The primary phase circuit input is connectable to a mains supply to connect the primary phase to the mains supply. The OBC further includes a secondary phase including a circuit having an input and an output. The secondary phase circuit input has an input capacitor. The OBC further includes a pre-charge circuit connected between the primary phase circuit output and the secondary phase circuit output. The pre-charge circuit is switchable between an opened state in which the pre-charge circuit disconnects the input capacitor from the primary phase circuit output and a closed state in which the pre-charge circuit connects the input capacitor to the primary phase circuit output. When the pre-charge circuit is in the closed state an electrical current may flow through the pre-charge circuit from the primary phase circuit output to the input capacitor to charge the input capacitor.

This OBC may further include a controller configured to switch the pre-charge circuit to the closed state upon the controller detecting that the mains supply is a single-phase mains supply after the primary phase has been connected to the mains supply. The controller may be further configured to switch the pre-charge circuit to the opened state upon the controller detecting that the input capacitor has been sufficiently charged with electrical current via the pre-charge circuit.

This OBC may further include a relay connected between the primary phase circuit input and the secondary phase circuit input. The relay is switchable between (i) an opened state in which the relay disconnects the primary phase circuit input from the secondary phase circuit input and a closed state in which the relay connects the primary phase circuit input to the secondary phase circuit input and thereby connects the secondary phase to the mains supply when the primary phase is connected to the mains supply. In this case, this OBC may further include a controller configured to switch the pre-charge circuit to the closed state upon the controller detecting that the mains supply is a single-phase mains supply after the primary phase has been connected to the mains supply. The controller may be further configured to maintain the relay in the opened state until the input capacitor has been sufficiently charged with electrical current via the pre-charge circuit and then switch the relay to the closed state. The controller may be further configured to switch the pre-charge circuit to the opened state upon the controller detecting that the input capacitor has been sufficiently charged with electrical current via the pre-charge circuit.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
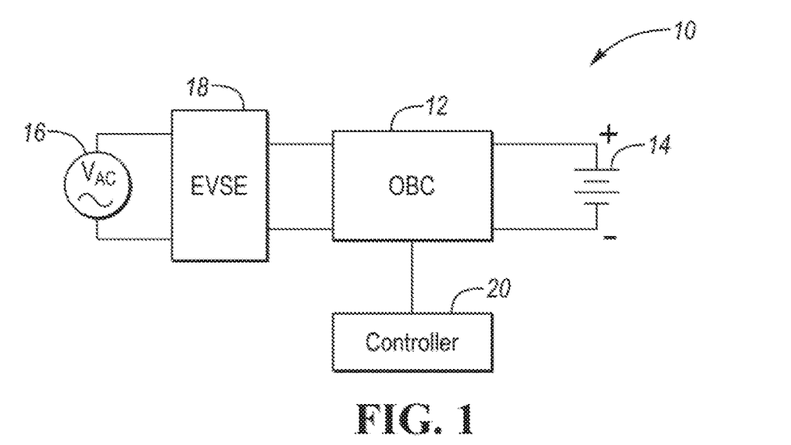
FIG. 1 illustrates a block diagram of an electrical system having a multi-phase, on-board charger (OBC)

Referring now to FIG. 1, a block diagram of an electrical system 10 having an on-board charger (OBC) 12 is shown. OBC 12 is "on-board" an electric vehicle. The term "electric vehicle" herein encompasses any type of vehicle which uses electrical power for vehicle propulsion and encompasses battery-only electric vehicles (BEV), hybrid electric vehicles (HEV), plug-in hybrid electric vehicles (PHEV), and the like. OBC 12 is used for charging a traction battery 14 of the electric vehicle. Traction battery 14 is a high voltage (HV) DC traction battery per electrical energy requirements for electric vehicle propulsion.

Electrical system 10 further includes an AC power source such as a mains supply 16 of the electrical grid. OBC 12 charges traction battery 14 using electrical power from mains supply 16. OBC 12 has an input which connects to mains supply 16 by an external Electric Vehicle Supply Equipment (EVSE) 18 to absorb electrical power from the mains supply. OBC 12 has an output which connects to traction battery 14. OBC 12 converts electrical power absorbed from mains supply 16 into DC electrical power and charges traction battery 14 with the DC electrical power.

A controller 20 is associated with OBC 12. Controller 20 is an electronic device such as a processor, micro-controller, or the like (e.g., a computer) on-board the electric vehicle (e.g., a vehicle controller). Controller 20 is in communication with OBC 12 to control operations of the OBC. Controller 20 controls OBC 12 in converting electrical power from mains supply 16 into DC electrical power and charging traction battery 14 with the DC electrical power. For example, controller 20 appropriately controls switching and switching duration of power transistor switches (not shown) of OBC 12 used for converting electrical power from mains supply 16 into a selected amount of DC electrical power. Controller 20 is also operable to communicate and control other nodes of electrical system 10 and the electric vehicle including nodes involved in the charging applications.

Figure 2:
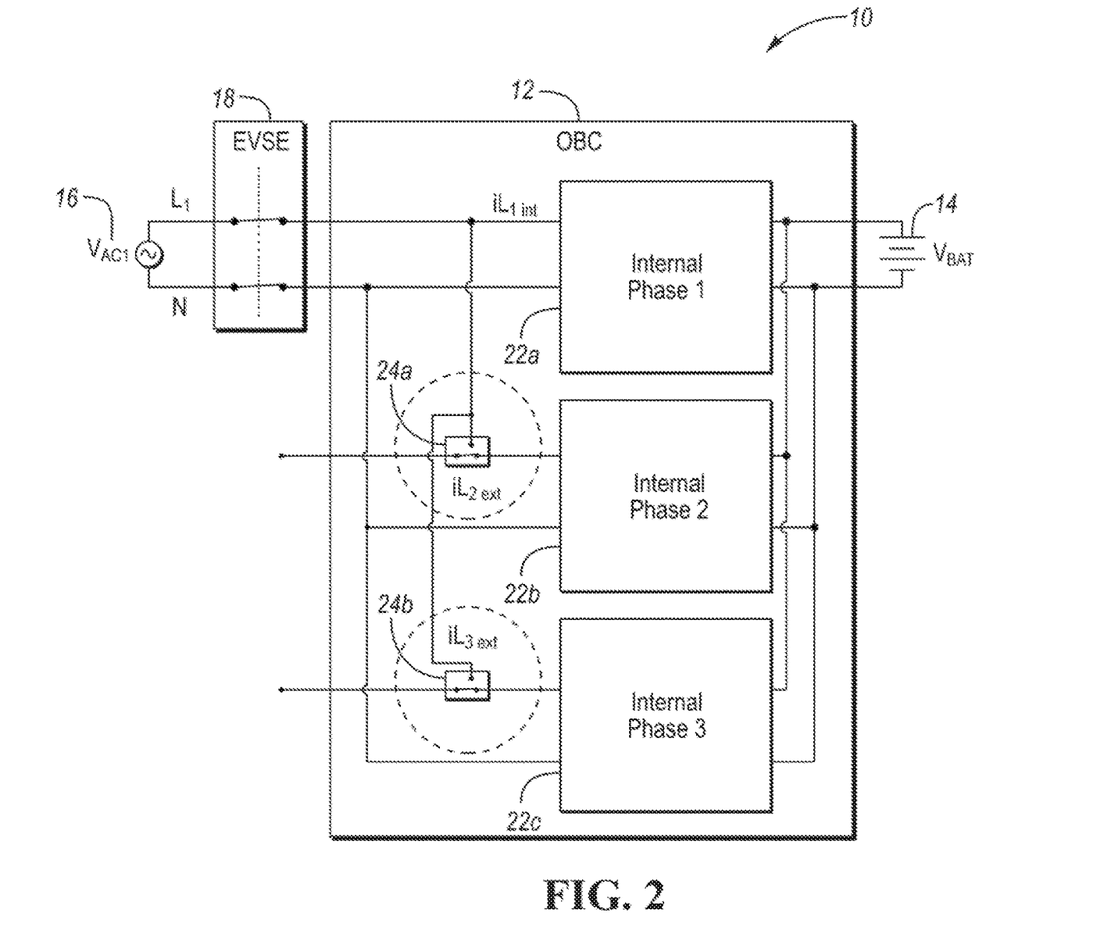
FIG. 2 illustrates a block diagram of the electrical system with a detailed depiction of the OBC showing the phases of the OBC and input relays of the OBC between the phases.

Referring now to FIG. 2, with continual reference to FIG. 1, a block diagram of electrical system 10 with a detailed depiction of OBC 12 is shown. OBC 12 is a N-phase OBC, where N is an integer greater than one. As such, OBC 12 is a multi-phase OBC having at least two phases (i.e., branches). For example, as shown in FIG. 2, OBC 12 is a three-phase OBC having first, second, and third phases 22*a*, 22*b*, and 22*c*.

Phases 22*a*, 22*b*, and 22*c* have the same electrical circuitry for converting electrical power from mains supply 16 into DC electrical power for charging traction battery 14. For example, each phase 22*a*, 22*b*, and 22*c* has an AC electromagnetic interference (EMI) filter ("EMI input filter" or "input filter") (shown in FIG. 4) followed serially by (not shown) a power factor corrector (PFC), a DC link capacitor, a DC/DC converter, and an output filter. Controller 20 controls the operation of the electrical circuitry of phases 22*a*, 22*b*, and 22*c* in converting electrical power from mains supply 16 into DC electrical power and delivering the DC electrical power to traction battery 14.

Each phase 22*a*, 22*b*, and 22*c* is to be connected to mains supply 16 for that phase to absorb electrical power from the mains supply and to convert same into DC electrical power for charging traction battery 14. Phases 22a, 22b, and 22c are connected in parallel between the input of the OBC and the output of the OBC. Each phase 22a, 22b, and 22c, for instance, can deliver 3.6 kW of electrical power for charging traction battery 14. As such, in this instance, OBC 12 can deliver 10.8 kW (3*3.6 kW) of electrical power for charging traction battery 14.

OBC 12 further includes input relays 24a and 24b. Input relay 24a is between the inputs of phases 22a and 22b. Input relay 24b is between the inputs of phases 22a and 22c. Input relays 24a and 24b are switchable between opened and closed states. Controller 20 is operable to control the switching of input relays 24a and 24b.

In one or more embodiments, silicon switches may be used as one or more of the relays. In this case, instead of a single relay with normally open and normally closed output contacts, two normally open silicon switches are used. The term "relay" herein encompasses such silicon switches.

A closed input relay connects the inputs of the two phases that the input relay is between. That is, two phases are combined when the input relay between the inputs of these two phases is closed. Conversely, an opened input relay disconnects the two phases that the input relay is between. That is, two phases are not combined when the input relay between the inputs of these two phases is opened.

Input relays 24a and 24b are both shown in FIG. 2 in an opened state. Thus, phase 22b is not combined with phase 22a as input relay 24a between phases 22a and 22b is opened. Likewise, phase 22c is not combined with phase 22a as input relay 24b between phases 22a and 22c is opened.

Mains supply 16 is a single-phase mains supply as shown in FIG. 2. Phase 22a is directly connectable to mains supply 16 whereas phases 22b and 22c are connectable to the mains supply via closed input relays 24a and 24b, respectively. As such, phase 22a may be referred to herein as "primary" phase and phases 22b and 22c may be referred to herein as "secondary" phases.

In FIG. 2, as input relays 24a and 24b are both opened, only phase 22a is connected to mains supply 16. Input relay 24a is to be closed (shown in FIG. 3) for phase 22b to be combined with phase 22a and thereby be connected to mains supply 16. Likewise, input relay 24b is to be closed for phase 22c to be combined with phase 22a and thereby be connected to mains supply 16.

Controller 20 operates to switch close input relays 24a and 24b when mains supply 16 is a single-phase mains supply (i.e., when mains supply 16 is only directly connected to one of phases 22a, 22b, and 22c; in this case, only primary phase 22a). Phases 22a, 22b, and 22c are combined when input relays 24a and 24b are switched closed. Secondary phases 22b and 22c are thereby connected to mains supply 16 via closed input relays 24a and 24b, respectively.

Figure 3:
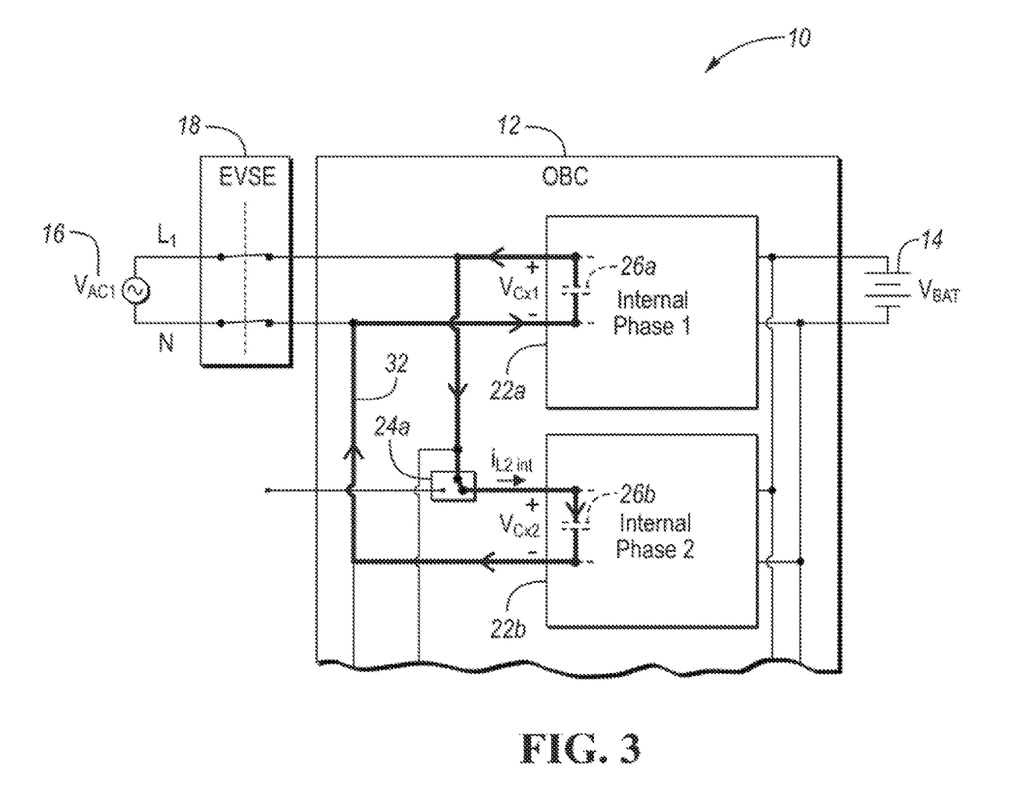
FIG. 3 illustrates a block diagram of the electrical system with a detailed depiction of the OBC showing input capacitors of two of the phases and an electrical current flow path between the input capacitors via the input relay connecting these two phases.

Referring now to FIG. 3, with continual reference to FIG. 2, a block diagram of electrical system 10 with a detailed depiction of OBC 12 is shown. Phase 22c is not shown in FIG. 3. An input portion of the electrical circuitry of each phase has a capacitance. The input portion of the electrical circuitry having the capacitance may be a single component, a set of components that are part of a complex filter, etc. The capacitance may be modeled as an input capacitor. Herein the term "input capacitor" represents the capacitance of the input portion of the electrical circuitry of a phase. For example, the input capacitor of each phase may be internal to the EMI input filter of the phase and located at the input side of the EMI input filter of the phase. In this regard, as shown in FIG. 3, phase 22a includes input capacitor 26a; and phase 22b includes input capacitor 26b.

FIG. 3 further shows an electrical current flow path 32 between input capacitors 26a and 26b of phases 22a and 22b via closed input relay 24a. It is noted that the flow direction corresponds to a positive half period of the AC input and that the flow direction is reversed during the negative half period of the AC input. While phase 22a is connected to mains supply 16 and is absorbing electrical power from the mains supply, a transient electrical current flows through electrical current flow path 32 between input capacitors 26a and 26b upon input relay 24a being switched closed. This transient electrical current flows through closed input relay 24a and charges input capacitor 26b of phase 22b.

An issue is that the fact that mains supply 16 is single-phase, as opposed to being three-phase in correspondence with three-phase OBC 12, may only be detected after EVSE 18 is already sourcing. This is an issue because "inrush peak" transient electrical current provided along electrical current flow path 32 and through input relay 24a to input capacitor 26b of phase 22b may damage input relay 24a if input capacitor 26b of phase 22b is not pre-charged. Likewise, inrush peak transient electrical current provided through input relay 24b to the input capacitor of phase 22c may damage input relay 24b if the input capacitor of phase 22c is not pre-charged.

The issue of inrush peak charging of the input capacitor of a phase can be mitigated by making the input relay, through which the inrush peak electrical current flows, physically larger. This is not ideal as the size, weight, and cost of the input relay, and thereby the OBC, will be increased.

Figure 4:
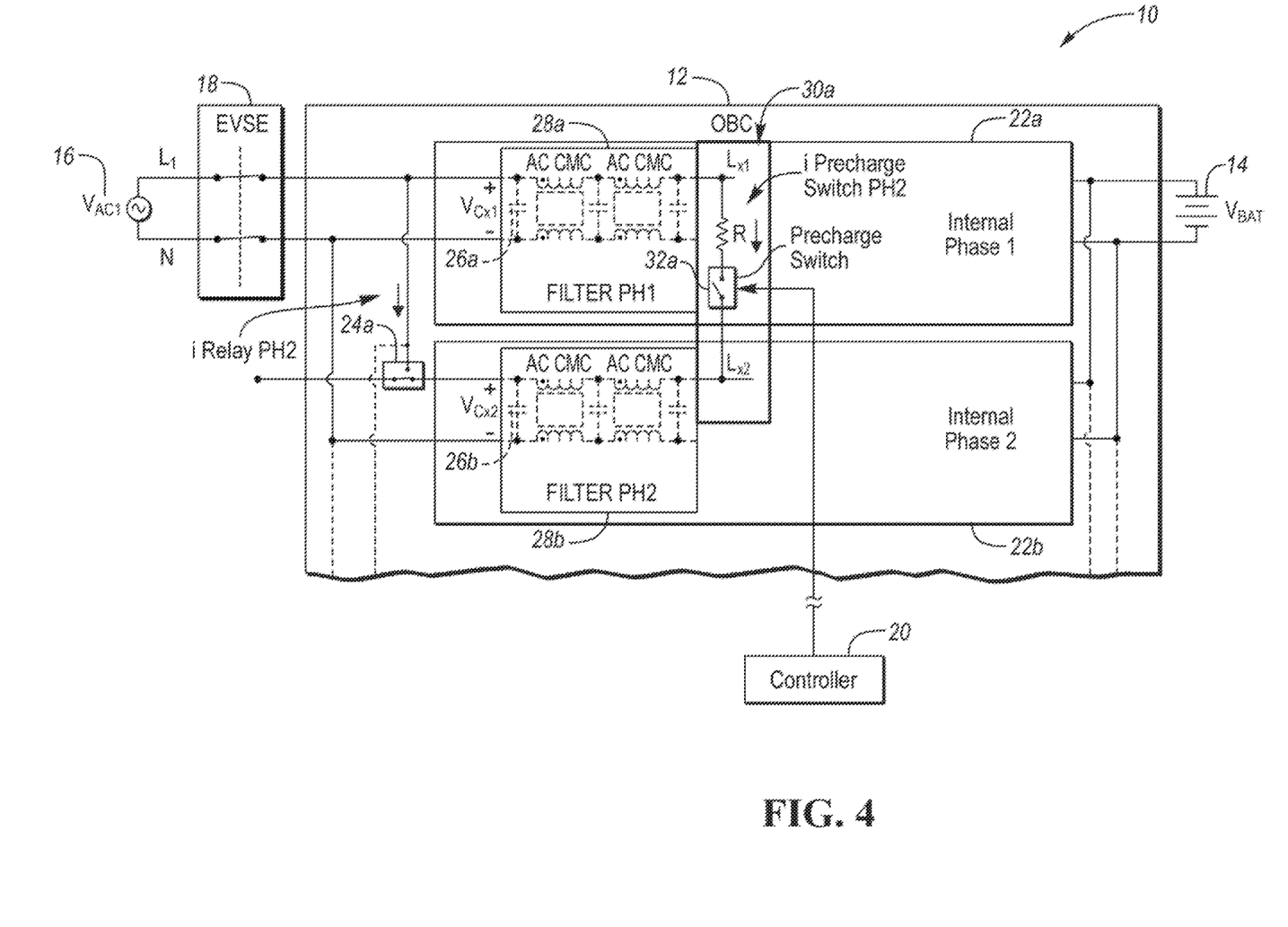
FIG. 4 illustrates a block diagram of the electrical system with a detailed depiction of the OBC showing the input capacitor and an input filter of two of the phases and a pre-charge circuit connected between the outputs of the input filters of these two phases.

Referring now to FIG. 4, with continual reference to FIGS. 2 and 3, a block diagram of electrical system 10 with a detailed depiction of OBC 12 is shown. Phase 22c is not shown in FIG. 4. As noted above, each phase 22a, 22b, and 22c includes an AC EMI input filter ("input filter"). In this regard, as shown in FIG. 4, phase 22a includes input filter 28a; and phase 22b includes input filter 28b. As described above, the input filter of each phase is part of the electrical circuitry of the phase and may be the first stage of the phase before the rectifier and the PFC of the phase. As shown in FIG. 4, the input capacitor of each phase is part of the input filter of the phase and is located at the input side of the input filter of the phase.

OBC 12 further includes pre-charge circuits. In this embodiment, each pre-charge circuit is connected between the output of input filter 28a of phase 22a and the output of the input filter of a secondary phase. For instance, as shown in FIG. 4, a pre-charge circuit 30a is connected between the output of input filter 28a of phase 22a and the output of input filter 28b of phase 22b. Likewise, a pre-charge circuit (not shown) is connected between the output of input filter 28a of phase 22a and the output of the input filter of phase 22c. Alternatively, the pre-charge networks share part of the components (e.g., there is a single pre-charge circuit with multiple connections). For example, in the exemplary depiction in FIG. 4, a resistor of a pre-charge circuit could be common and from there it would be a switch to each of the other phases.

Each pre-charge circuit includes a resistor and a switch ("pre-charge switch") connected in series between a node of the output of input filter 28a of primary phase 22a and the output of the input filter of a secondary phase. The pre-charge switch is switchable between opened and closed states. Controller 20 is operable for switching the pre-charge switch between the opened and closed states.

For instance, as shown in FIG. 4, pre-charge circuit 30a includes a resistor R and a pre-charge switch 32a connected in series between a node ($L_{x1}$) of the output of input filter 28a of phase 22a and a node ($L_{x2}$) of the output of input filter 28b of phase 22b. When pre-charge switch 32a is opened, the outputs of input filters 28a and 28b of phases 22a and 22b are disconnected from one another via pre-charge circuit 30a. Conversely, when pre-charge switch 32a is closed, the outputs of input filters 28a and 28b of phases 22a and 22b are connected to one another via pre-charge circuit 30a.

Electrical current may flow from phase 22a out through the output of input filter 28a of phase 22a and into the output of input filter 28b of phase 22b when pre-charge switch 32a is closed. The electrical current flowing into the output of input filter 28b of phase 22b flows through input filter 28b to input capacitor 26b of phase 22b. In this way, input capacitor 26b of phase 22b can be pre-charged with electrical current. Again, the described flow direction corresponds to a positive half period of the AC input and the flow direction is reversed during the negative half period of the AC input.

Accordingly, input capacitor 26b of phase 22b is pre-charged with electrical current by activating pre-charge circuit 30a (i.e., by switching close pre-charge switch 32a). Particularly, pre-charge circuit 30a is activated prior to input relay 24a being activated (i.e., prior to input relay 24a being switched closed) upon primary phase 22a being connected to mains supply 16 and absorbing electrical power from the mains supply.

As input capacitor 26b of phase 22b is pre-charged prior to input relay 24a being activated, no inrush peak current flows through input relay 24a to input capacitor 26b of phase 22b upon input relay 24a being activated. Thus, the issue of being able to detect the fact that mains supply 16 is single-phase, only after EVSE 18 is already sourcing, is resolved by activating pre-charge circuit 30a prior to input relay 24a being activated.

The described resistor and pre-charge switch combination is an example of the topology which a pre-charge circuit may have. This is believed to be the simplest topology. However, other topologies or technologies could provide the same functionality (maybe adding other features) using other components. For example, pre-charge current could be limited by means of a switched voltage regulator.

In accordance with an embodiment, the operation of OBC 12 charging traction battery 14 using electrical power from mains supply 16 begins with the input of the OBC being connected to the mains supply by EVSE 18. As mains supply 16 is a single-phase mains supply, only primary phase 22a is connected to the mains supply and absorbs electrical power from the mains supply. Only primary phase 22a is connected to mains supply 16 initially as input relays 24a and 24b are switched opened. Typically, as described above, input relays 24a and 24b are then switched closed upon detecting that mains supply 16 is single-phase. As further described above, this may cause the issue involving too much inrush peak transient electrical current flowing through input relays 24a and 24b for charging the input capacitors of secondary phases 22b and 22c.

In accordance with the embodiment, controller 20 activates the pre-charge circuits upon detecting that mains supply 16 is single-phase. That is, controller 20 activates the pre-charge circuits while controlling the input relays to remain opened upon the controller detecting that mains supply 16 is single-phase. Controller 20 activates the pre-charge circuits for the input capacitors of secondary phases 22b and 22c to be pre-charged with electrical current from primary phase 22a via the corresponding pre-charge circuits. This pre-charging of the input capacitors of secondary phases 22b and 22c occurs while input relays 24a and 24b are opened.

For instance, controller 20 activates pre-charge circuit 30a by closing pre-charge switch 32a. Electrical current may thereby flow from main phase 22a out through the output of input filter 28a of phase 22a and into the output of input filter 28b of secondary phase 22b. This electrical current further flows through input filter 28b of secondary phase 22b to input capacitor 26b of secondary phase 22b. Input capacitor 26b is thereby pre-charged with electrical current. The pre-charging of input capacitor 26b via pre-charge circuit 30a occurs while input relay 24a remains opened.

After the input capacitors of secondary phases 22b and 22c have been pre-charged with electrical current from primary phase 22a via the corresponding pre-charge circuits, controller 20 activates input relays 24a and 24b and de-activates the pre-charge circuits. The deactivation of the pre-charge circuits may occur after input relays 24a and 24b have been activated. Secondary phases 22b and 22c are thereby connected via closed input relays 24a and 24b to mains supply 16. Secondary phases 22a and 22b then absorb electrical power from mains supply 16 for conversion into DC electrical power for charging traction battery 14 as described herein.

For instance, after input capacitor 26b of secondary phase 22b is pre-charged with electrical current from primary phase 22a via pre-charge circuit 30a, controller 20 activates input relay 24a and de-activates pre-charge circuit 30a. Secondary phase 22b is thereby connected via closed input relay 24a to mains supply 16 and absorbs electrical power from the mains supply for conversion into DC electrical power.

As described, in embodiments, the operation involving activating the pre-charge circuits enables the OBC to be adaptable between a single-phase mains supply and a multi-phase mains supply. For instance, as described herein, three-phase OBC is adaptable between a single-phase mains supply and a three-phase mains supply. The use of the pre-charge circuits enables the input relays to be dimensioned smaller as they will only have to handle relatively less inrush peak electrical current. This reduces cost, weight, and size. The input relays may have to withstand, for example, 800 A if the pre-charge circuits were not utilized.

In sum, in embodiments, the input relays are optimized to charging currents without inrush currents. This reduces size of the input relays such as on the order of 50% and provides cost reduction such as on the order of 40%. The pre-charge path via a pre-charge circuit is optimized (using OBC existing components) to minimize the size of the resistor of the pre-charge circuit.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An on-board charger (OBC) for charging a traction battery of an electric vehicle, comprising:
a primary phase including a circuit having an input and an output, the primary phase circuit input being connectable to a mains supply to connect the primary phase to the mains supply;
a secondary phase including a circuit having an input and an output, the secondary phase circuit input having an input capacitor; and
a pre-charge circuit connected between the primary phase circuit output and the secondary phase circuit output, wherein the pre-charge circuit is switchable between an opened state in which the pre-charge circuit disconnects the secondary phase circuit output from the primary phase circuit output and a closed state in which the pre-charge circuit connects the secondary phase circuit output to the primary phase circuit output, wherein when the pre-charge circuit is in the closed state an electrical current may flow through the pre-charge circuit from the primary phase circuit output to the secondary phase circuit output and through the secondary phase circuit to the input capacitor to charge the input capacitor.

2. The OBC of claim 1 further comprising:
a controller configured to switch the pre-charge circuit to the closed state upon the controller detecting that the mains supply is a single-phase mains supply after the primary phase has been connected to the mains supply.

3. The OBC of claim 2 wherein:
the controller is further configured to switch the pre-charge circuit to the opened state upon the controller detecting that the input capacitor has been sufficiently charged with electrical current via the pre-charge circuit.

4. The OBC of claim 1 further comprising:
a relay connected between the primary phase circuit input and the secondary phase circuit input, wherein the relay is switchable between an opened state in which the relay disconnects the primary phase circuit input from the secondary phase circuit input and a closed state in which the relay connects the primary phase circuit input to the secondary phase circuit input and thereby connects the secondary phase to the mains supply when the primary phase is connected to the mains supply.

5. The OBC of claim 4 further comprising:
a controller configured to switch the pre-charge circuit to the closed state upon the controller detecting that the mains supply is a single-phase mains supply after the primary phase has been connected to the mains supply; and
the controller further configured to maintain the relay in the opened state until the input capacitor has been sufficiently charged with electrical current via the pre-charge circuit and then switch the relay to the closed state.

6. The OBC of claim 5 wherein:
the controller is further configured to switch the pre-charge circuit to the opened state upon the controller detecting that the input capacitor has been sufficiently charged with electrical current via the pre-charge circuit.

7. The OBC of claim 1 wherein:
the pre-charge circuit includes a resistor and a switch connected in series.

8. The OBC of claim 1 wherein:
the circuit of at least one of the primary phase and the secondary phase is an input filter.

9. The OBC of claim 1 further comprising:
an additional secondary phase including a circuit having an input and an output, the additional secondary phase circuit input having an input capacitor; and
an additional pre-charge circuit connected between the primary phase circuit output and the additional secondary phase circuit output, wherein the additional pre-charge circuit is switchable between an opened state in which the additional pre-charge circuit disconnects the additional secondary phase circuit output from the primary phase circuit output and a closed state in which the additional pre-charge circuit connects the additional secondary phase circuit output to the primary phase circuit output, wherein when the additional pre-charge circuit is in the closed state an electrical current may flow through the additional pre-charge circuit from the primary phase circuit output to the additional secondary phase circuit output and through the additional secondary phase circuit to the input capacitor to charge the input capacitor of the additional secondary phase circuit input.

10. The OBC of claim 1 further comprising:
an additional secondary phase including a circuit having an input and an output, the additional secondary phase circuit input having an input capacitor; and
wherein the pre-charge circuit is further connected between the primary phase circuit output and the additional secondary phase circuit output, the pre-charge circuit is further switchable between a second opened state in which the pre-charge circuit disconnects the additional secondary phase circuit output from the primary phase circuit output and a second closed state in which the pre-charge circuit connects the additional secondary phase circuit output to the primary phase circuit output, wherein when the pre-charge circuit is in the second closed state an electrical current may flow through the pre-charge circuit from the primary phase circuit output to the additional secondary phase circuit output and through the additional secondary phase circuit to the input capacitor to charge the input capacitor of the additional secondary phase circuit input.

11. A method for use with an on-board charger (OBC) for charging a traction battery of an electric vehicle, wherein the OBC includes a primary phase including a circuit having an input and an output, the primary phase circuit input being connectable to a mains supply to connect the primary phase to the mains supply, a secondary phase including a circuit having an input and an output, the secondary phase circuit input having an input capacitor, and a pre-charge circuit connected between the primary phase circuit output and the secondary phase circuit output, wherein the pre-charge circuit is switchable between an opened state in which the pre-charge circuit disconnects the secondary phase circuit output from the primary phase circuit output and a closed state in which the pre-charge circuit connects the secondary phase circuit output to the primary phase circuit output, the method comprising:
upon detecting that the mains supply is a single-phase mains supply after the primary phase has been connected to the mains supply, switching the pre-charge circuit to the closed state so that an electrical current may flow through the pre-charge circuit from the primary phase circuit output to the secondary phase circuit output and through the secondary phase circuit to the input capacitor to charge the input capacitor.

12. The method of claim 11 further comprising:
switching the pre-charge circuit to the opened state upon detecting that the input capacitor has been sufficiently charged with electrical current via the pre-charge circuit.

13. The method of claim 11 wherein the OBC further includes a relay connected between the primary phase circuit input and the secondary phase circuit input, wherein the relay is switchable between an opened state in which the relay disconnects the primary phase circuit input from the secondary phase circuit input and a closed state in which the relay connects the primary phase circuit input to the secondary phase circuit input and thereby connects the secondary phase to the mains supply when the primary phase is connected to the mains supply, the method further comprising:
switching the pre-charge circuit to the closed state upon detecting that the mains supply is a single-phase mains supply after the primary phase has been connected to the mains supply; and
maintaining the relay in the opened state until the input capacitor has been sufficiently charged with electrical current via the pre-charge circuit and then switching the relay to the closed state.

14. The method of claim 13 further comprising:
switching the pre-charge circuit to the opened state upon detecting that the input capacitor has been sufficiently charged with electrical current via the pre-charge circuit.

15. An on-board charger (OBC) for charging a traction battery of an electric vehicle, comprising:
a primary phase including a circuit having an input and an output, the primary phase circuit input being connectable to a mains supply to connect the primary phase to the mains supply;
a secondary phase including a circuit having an input and an output, the secondary phase circuit input having an input capacitor; and
a pre-charge circuit connected between the primary phase circuit output and the input capacitor, wherein the pre-charge circuit is switchable between an opened state in which the pre-charge circuit disconnects the input capacitor from the primary phase circuit output and a closed state in which the pre-charge circuit connects the input capacitor to the primary phase circuit output, wherein when the pre-charge circuit is in the closed state an electrical current may flow through the pre-charge circuit from the primary phase circuit output to the input capacitor to charge the input capacitor.

16. The OBC of claim 15 further comprising:
a controller configured to switch the pre-charge circuit to the closed state upon the controller detecting that the mains supply is a single-phase mains supply after the primary phase has been connected to the mains supply.

17. The OBC of claim 16 wherein:
the controller is further configured to switch the pre-charge circuit to the opened state upon the controller detecting that the input capacitor has been sufficiently charged with electrical current via the pre-charge circuit.

18. The OBC of claim 15 further comprising:
a relay connected between the primary phase circuit input and the secondary phase circuit input, wherein the relay is switchable between an opened state in which the relay disconnects the primary phase circuit input from the secondary phase circuit input and a closed state in which the relay connects the primary phase circuit input to the secondary phase circuit input and thereby connects the secondary phase to the mains supply when the primary phase is connected to the mains supply.

19. The OBC of claim 18 further comprising:
a controller configured to switch the pre-charge circuit to the closed state upon the controller detecting that the mains supply is a single-phase mains supply after the primary phase has been connected to the mains supply; and
the controller further configured to maintain the relay in the opened state until the input capacitor has been sufficiently charged with electrical current via the pre-charge circuit and then switch the relay to the closed state.

20. The OBC of claim 19 wherein:
the controller is further configured to switch the pre-charge circuit to the opened state upon the controller detecting that the input capacitor has been sufficiently charged with electrical current via the pre-charge circuit.

* * * * *